United States Patent
Panainte

(10) Patent No.: US 11,189,200 B2
(45) Date of Patent: Nov. 30, 2021

(54) FLYING ARTEFACT AND ITS DEVICE FOR AERIAL ADVERTISING

(71) Applicants: Petrica Panainte, Madrid (ES); Aurora Díaz Ocaña, Madrid (ES)

(72) Inventor: Petrica Panainte, Madrid (ES)

( * ) Notice: Subject to any disclaimer, the term of this patent is extended or adjusted under 35 U.S.C. 154(b) by 0 days.

(21) Appl. No.: 16/606,036

(22) PCT Filed: Apr. 18, 2018

(86) PCT No.: PCT/ES2018/070312
§ 371 (c)(1),
(2) Date: Oct. 17, 2019

(87) PCT Pub. No.: WO2018/193143
PCT Pub. Date: Oct. 25, 2018

(65) Prior Publication Data
US 2020/0168136 A1    May 28, 2020

(30) Foreign Application Priority Data
Apr. 20, 2017 (ES) .............................. ES201730466U

(51) Int. Cl.
*G09F 21/08* (2006.01)
*B64C 31/06* (2020.01)

(52) U.S. Cl.
CPC .............. *G09F 21/08* (2013.01); *B64C 31/06* (2013.01)

(58) Field of Classification Search
CPC ......... G09F 21/06; G09F 21/08; B64C 31/06; A63H 27/08
USPC ......................... 40/212, 214, 215; 244/153 R
See application file for complete search history.

(56) References Cited

U.S. PATENT DOCUMENTS

| | | | | |
|---|---|---|---|---|
| 854,461 | A * | 5/1907 | Burnell | G09F 21/10 40/214 |
| 4,624,648 | A * | 11/1986 | Waters | A63H 33/40 112/475.08 |
| 5,213,289 | A * | 5/1993 | Barresi | B64D 17/025 244/145 |
| 5,365,685 | A * | 11/1994 | Shank | G09F 21/06 40/212 |
| 9,511,836 | B2 * | 12/2016 | Berrang | B63H 9/069 |

FOREIGN PATENT DOCUMENTS

WO    WO-2010131986 A1 *  11/2010  ............. B64C 31/06

* cited by examiner

*Primary Examiner* — Gary C Hoge

(57) ABSTRACT

Flying artefact for aerial advertising to be pulled from the surface or tied up to a fixed point, which includes an element of elevation and suspension in the air (1) with advertising medium function, built in a very light and resistant material, with the shape of an aerodynamic profile, which has an opening (4) at its front part reinforced with light and resistant tubes, and an opening (5) on its back, which has a curved upper surface (6), a flat lower surface (7), and two vertical lateral surfaces (9), which acquires its shape when the air passes through its four surfaces; a pulling or clamping line (3) which is tied up to the chosen pulling means or fixed point; at least two ropes (2) that connect the pulling or clamping line (3) with the front opening (4); the advertising message (10) being placed and directly exhibited on both sides and all along the element of elevation and suspension (1).

8 Claims, 2 Drawing Sheets

FLYING ARTEFACT AND ITS DEVICE FOR AERIAL ADVERTISING

TECHNICAL FIELD

The present invention belongs to the field of advertising, and more specifically to the field of aerial advertising.

The object of the present invention is a flying artefact whose purpose is to make aerial advertising without using any means of air transportation. In this way, a much more efficient as well as astonishing form of aerial advertising is achieved.

BACKGROUND OF THE INVENTION

Currently, aerial advertising services are served primarily in two ways. One of them, the most widespread, consists in pulling advertising banners using air transport, small planes being the most used, and sometimes helicopters. Another form, although not as widespread, is the use of powered paragliders, so advertising is exhibited on the paraglider canopy or by pulling an advertising banner.

Using small planes or helicopters for pulling aerial advertising involves very high operation and maintenance costs. As a result, many businesses do not have access to this type of advertising. It also poses a high risk for the pilot and for the people on the ground.

Also, aeronautical legislation establishes limitations on distances and minimum flight altitudes to safeguard the safety of operators and any people on the ground. Therefore the banners have to achieve certain minimum dimensions so that advertising messages are visible and identifiable.

If a powered paraglider is used for aerial advertising, and the advertising is printed on the paraglider canopy, it limits the available area to insert the advertising. In addition, this way the advertising message is not exhibited in a suitable position to make it easily readable by the public on the ground. When a powered paraglider pulls an advertising banner, this implies an added risk for the pilot, in addition to the legal limitations that exist for this kind of activity to protect the safety of pilots and the people on the ground.

Currently, there isn't a flying artefact or a device specifically designed for aerial advertising that avoids all the problems mentioned above.

SUMMARY OF THE INVENTION

The objective of the present invention is to provide a new elevation, suspension, and pulling system for aerial advertising that reduces the costs, risks and limitations traditionally associated with such activity. In addition, it allows a very attractive and eye-catching fixed aerial advertising, exhibiting it at a fixed point.

According to one of the aspects of the present invention, we present a flying artefact for aerial advertising that includes an element of elevation and suspension in the air, built with a very light and resistant material, without the essence of the invention to be affected or limited by the material used, with the shape of an aerodynamic profile, which has an opening in its front part or leading edge, in the edge of which and as an accessory, an inert gas chamber is applied and held, and an opening in its back or trailing edge, which has a curved upper surface, a flat lower surface and two vertical lateral surfaces, which acquires its shape with the air that passes through its four surfaces, and whose front opening is reinforced, at least in some parts, with very light and resistant means that give it rigidity; a few ropes that connect the pulling or clamping line with the front opening of the element of elevation and suspension; at least one pulling or clamping line is tied up to the chosen pulling means or fixed point; placing the advertising preferably on both sides and all along the element of elevation and suspension, which makes up the function of advertising medium itself.

The element of elevation and suspension is designed so that it presents an aerodynamic shape which allows its elevation by the effect of the wind/airflow or being pulled at a certain speed, staying then suspended in the air by the effect of the wind/airflow and/or during its pulling, and it has a low resistance when it is pulled due to an opening in its back or trailing edge.

The front opening of the element of elevation and suspension is reinforced with very light and resistant means that give it rigidity at the edge to allow the air to enter easily through its four surfaces, without the essence of the invention to be affected or limited by the used means.

At the said element of elevation and suspension, at least two ropes are joined, which in turn are joined to the pulling or clamping line, but three ropes are installed to bring stability.

These three ropes are joined to the front opening of the element of elevation and suspension in its lower left corner, its lower right corner and in the middle of its upper edge, respectively, and they join the pulling or clamping line at an imaginary point preferably located at the same level of the lower edge of the front opening and at a perpendicular distance from the centre of such lower edge, the same as the width of such lower edge, without the essence of the invention to be affected or limited by the number of ropes used or by their joining points with the element of elevation and suspension, and all of them with the pulling or clamping line.

The means used to reinforce the front opening edge of the element of elevation and suspension is to be articulated and foldable or detachable in order to make its handling, transport and storage easy.

With the object of compensating for a possible shortage of wind/airflow, the front opening edge of the element of elevation and suspension has an accessory that consists of an inert gas chamber applied to one or all its parts, which is added by clamping means that allow the chamber to be added or removed according to the circumstances and needs of every moment, without the essence of the invention to be affected or limited by the clamping means used. In this way, it becomes easier for the element of elevation and suspension to keep elevated when the airflow is insufficient, both during its pulling and when being exposed at a fixed point.

The pulling and clamping line is loosened and collected preferably guided by a system of pulleys and is stored by winding it on a reel, all properly installed in the chosen pulling means or fixed point, without the essence of the invention to be affected or limited by the system used to loosen, collect and store the line.

The advertising message is to be preferably arranged on both sides and all along with the element of elevation and suspension, and it can be incorporated therein in two possible ways. One option is to exhibit the advertising message on the same material that constitutes the element of elevation and suspension. A second and more practical option consists in making banners of a very light and resistant material with the advertising message on them, and they can be applied on both sides and all along such element, using some clamping means that allow an easy adhesion and removal.

The flying artefact for aerial advertising configured provide important advantages that should be noted.

If sufficient airflow does not fit through the front opening of the element of elevation and suspension, the descent of that element is carried out smoothly. In addition, since it is made of very lightweight materials, it is not capable of endangering the people on the ground.

It gives the possibility to carry out aerial advertising just as effective as the one made by small planes, but much more efficiently because operating costs are lower when a much simpler device is used. This is accomplished for example with the difference in spending on fuel and the fact that the use of ground transportation is easier in every way, as a small vessel or any other means of terrestrial pulling in comparison with air transport.

In this way, much less pollution, both acoustic and environmental, is emitted compared to that produced for example by a plane.

There is no law that sets a minimum limit of altitude for this type of flying artefact, so we can pull the advertising message much lower and thus better reach the target audience.

If the present invention is used for static aerial advertising tying the pulling line to a fixed point, a very eye-catching advertisement for the target audience because of its originality is achieved.

The ascent and descent of the element of elevation and suspension are achieved by loosening or collecting the pulling or clamping line from the chosen pulling means or fixed point. These maneuvers are accomplished without jeopardizing the safety of the operator or the public since the flying artefact is built with very light materials.

BRIEF DESCRIPTION OF THE DRAWINGS

To complement the description which is underway and in order to help get a better understanding of the features of the invention, accompanied to this descriptive report, as an integral part of it, you can find a drawing in which, with an illustrative and non-limiting nature, a realization of the invention has been represented.

DESCRIPTION OF THE PREFERRED EMBODIMENT

Below you can find a description of an example of preferred but not limiting realization of the flying artefact for aerial advertising that is the object of the present invention by referring to the attached figure.

Figure 1:
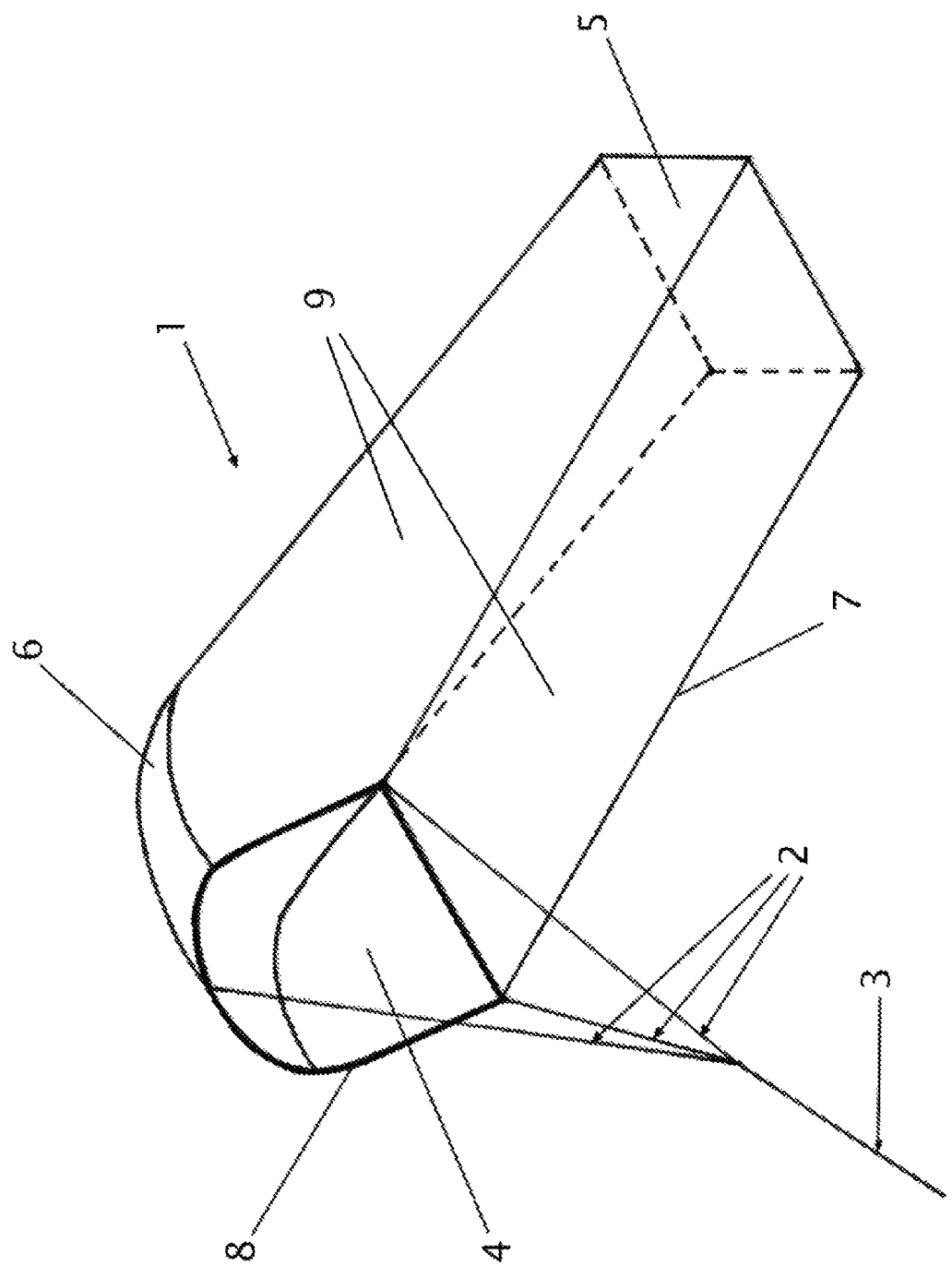
FIG. 1. It shows a view in perspective of an example of realization of the flying artefact and its device for aerial advertising from the bottom, represented in the position of use and which shows its general settings.
Figure 2:
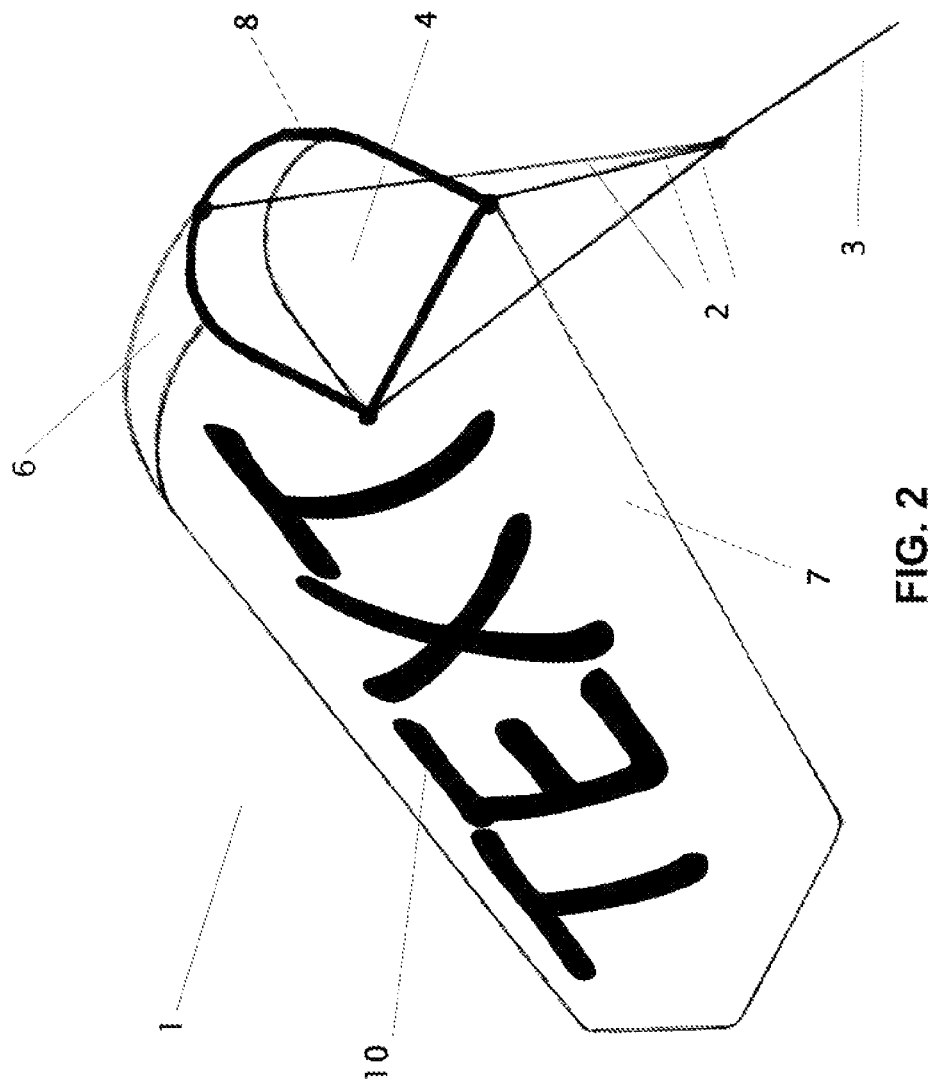
FIG. 2. It shows a view in perspective of the flying artefact for aerial advertising from its bottom and its right side, represented in the position of use and with its general settings, its front opening in position of flying and exhibiting an advertising message.

As shown in FIG. 1, the flying artefact and its device for aerial advertising includes an element of elevation and suspension (1) with the shape of an aerodynamic profile, which makes the function of advertising medium, built with a very light yet resistant material, to which three ropes or lines (2) are joined, which are joined to its other end, and in turn they are joined with pulling or clamping line (3) holding it to the chosen pulling means or a fixed point.

The element of elevation and suspension (1) has an opening (4) in its front side or leading edge and an opening (5) in its back or trailing edge, it has a curved upper surface, (6) a flat lower surface (7) and two vertical lateral surfaces (9), and acquires its shape when the air passes through its four surfaces. Its front opening (4), which, as illustrated in FIG. 1, the ratio of its height to its width is around 1 to 1, is reinforced in all its edges by a structure of tubes and/or rods (8) of a very light and resistant material to allow air to enter easily.

The three ropes (2) linking the element of elevation and suspension (1) with the pulling or clamping line (3) are tied up, each of them, to one point of the front opening (4) of the element (1), being these points its lower left corner, its lower right corner and the middle of the top edge, respectively. These three ropes (2) join the pulling or clamping line (3) at an imaginary point located preferably at the same level as the bottom edge of the front opening (4) and at a perpendicular distance from its center which is equal to the width of the bottom edge.

The parts that comprise the structure of tubes and/or rods (8) that reinforce the front opening (4) edge of the element of elevation and suspension (1) is articulated and foldable or become detached from each other with the purpose of facilitating the handling, transport, and storage of the element (1).

The front opening (4) edge of the element of elevation and suspension (1) has an accessory consisting of a helium chamber that can be applied and tied up with a hook-and-loop fastener and/or strings to any or all its parts when it is deemed necessary to compensate for the shortage of wind/airflow.

The pulling or clamping line (3) is loosened and collected preferably guided by a system of pulleys and is stored on a reel with a speed multiplier, all properly installed in the chosen pulling means or fixed point.

The advertising message (10) can be incorporated into the element of elevation and suspension in the air (1) in two possible ways. One option is to exhibit the advertising message (10) on the same material that constitutes the element (1), preferably on both sides and all along the flying artefact.

A second and more practical option consists in making banners of a very light and resistant material with the advertising message (10) exhibited on them, and they can be placed on both sides and all along of that element (1) by means of a hook-and-loop fastener system and/or adhesive tape.

The invention claimed is:

1. A flying artefact for aerial advertising, designed to be directed and pulled from the surface, which includes an element of elevation and suspension in the air (1) with the shape of an aerodynamic profile, that has an opening (4) at its front part or leading edge, having a curved upper surface (6), a flat lower surface (7) and two vertical lateral surfaces (9), which acquires its shape when the air passes through its four surfaces, and whose front opening (4) is rigidified, at least in some parts, by a structure of tubes and/or rods (8); a pulling or clamping line (3) which is tied up to a chosen pulling means or fixed point; at least three ropes (2) that connect the pulling or clamping line (3) with the front opening (4) in its lower left corner, its lower right corner and in its curved upper edge respectively; an advertising message (10) being placed on both sides and all along the element of elevation and suspension in the air (1).

2. A flying artefact for aerial advertising according to claim 1, characterized in that all the parts of its front opening (4) edge are rigidified by the structure of tubes and/or rods (8).

3. A flying artefact for aerial advertising according to claim 1, characterized in that the parts that comprise the structure of tubes and/or rods (8) are articulated and foldable.

4. A flying artefact for aerial advertising according to claim 1, characterized in that the parts that comprise the structure of tubes and/or rods (8) become detached from each other.

5. A flying artefact for aerial advertising according to claim 1, characterized in that the advertising message (10) is exhibited on a banner that is fixed on both sides and all along the element of elevation and suspension (1) with a system of hook-and-loop fastener and/or adhesive tape.

6. A flying artefact for aerial advertising according to claim 1, characterized in that the front opening (4) edge of the element of elevation and suspension (1) has an accessory consisting of a helium chamber that is applied and tied up to such front opening (4) with a system of hook-and-loop fastener and/or strings.

7. A flying artefact for aerial advertising according to claim 1, characterized in that a means to loosen, collect and store the pulling or clamping line (3) include a system of pulleys that guide such line and a reel where it is stored, all installed in the chosen pulling means or fixed point.

8. A flying artefact for aerial advertising according to claim 1, characterized in that the ratio of its front opening height to its front opening width is in a range of between 1,40 to 1 to 0,4 to 1.

\* \* \* \* \*